United States Patent [19]
von Braunhut

[11] Patent Number: 4,943,822
[45] Date of Patent: Jul. 24, 1990

[54] CAMERA FOR PHOTOGRAPHING SIMULATED X-RAY IMAGES

[76] Inventor: Harold von Braunhut, c/o Transcience Corporation, P.O. Box 809, Bryans Road, Md. 20616

[21] Appl. No.: 307,406
[22] Filed: Feb. 7, 1989
[51] Int. Cl.⁵ .................. G03B 13/02; G03B 17/18
[52] U.S. Cl. .................. 354/219; 354/288; 354/289.1; 350/167; 350/409
[58] Field of Search .............. 354/219, 295, 288, 202, 354/289.1; 350/409, 167, 315

[56] References Cited
U.S. PATENT DOCUMENTS 1,613,363  1/1927  Tessier .................. 354/295
3,592,533  7/1971  Braunhut ............... 350/409
3,711,183  1/1973  Braunhut ............... 350/167

Primary Examiner—A. A. Mathews
Attorney, Agent, or Firm—Helfgott & Karas

[57] ABSTRACT

A camera with an eyepiece and a lens having a common field of view of an object. Two optical devices are provided, each capable of simulating an X-ray image of an object viewed through the device. A connecting mechanism enables each of the optical devices to be simultaneously brought into optical registry or completely out of optical registry with a respective one of the eyepiece and lens. The camera can then take regular pictures or simulated X-ray pictures and in each case the viewer can visually see the type of picture being taken.

20 Claims, 3 Drawing Sheets

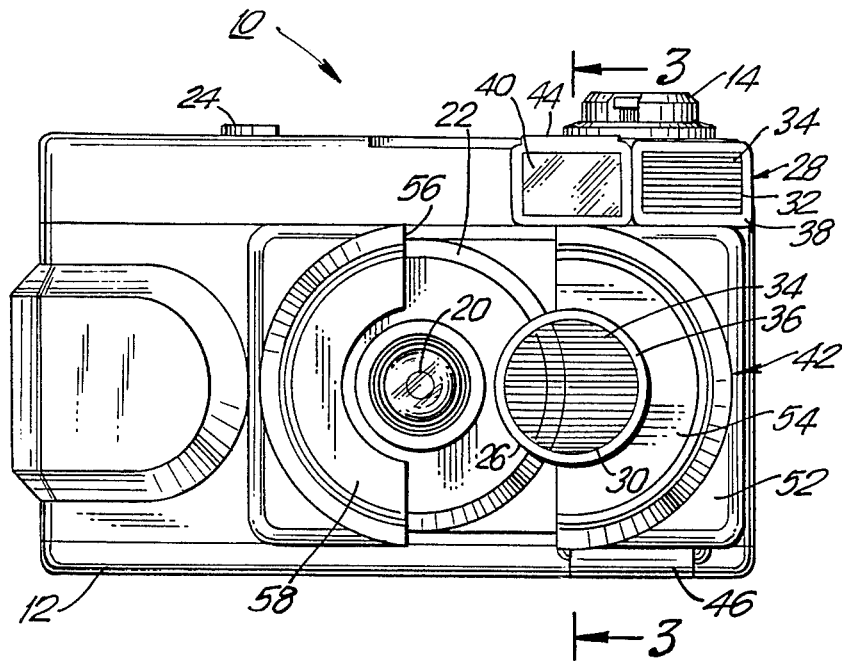
FIG.2
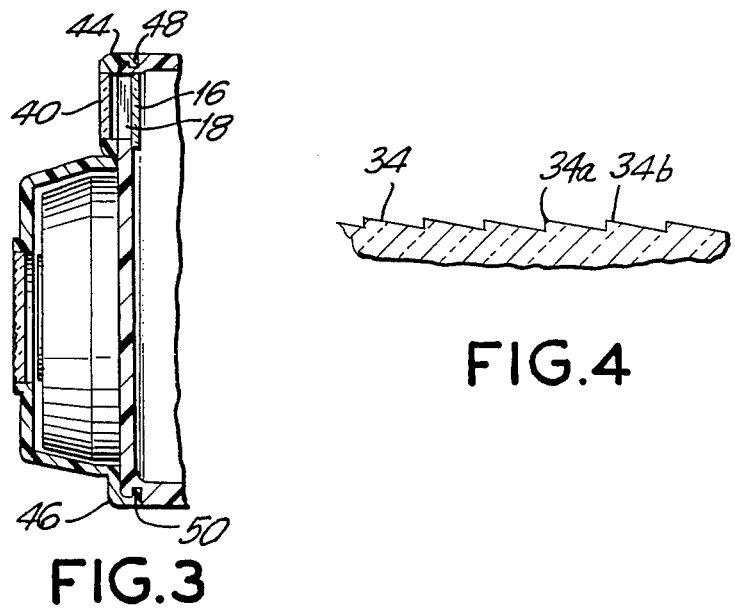
FIG.3
FIG.4

CAMERA FOR PHOTOGRAPHING SIMULATED X-RAY IMAGES

BACKGROUND OF INVENTION

My invention relates to optical equipment, and more particularly to a camera for producing photographs simulating X-ray images of an object.

Optical devices for providing a simulated X-ray image are known. By way of example, such devices comprise a feather interposed between two transparent panes of glass, or a pane of stressed thermoplastic material, as described in my U.S. Pat. No. 3,592,533, or a pane of thermoplastic material containing a plurality of parallel grooves on at least one surface thereof, as described in my U.S. Pat. No. 3,711,183. When an illuminated object, such as a hand, is viewed through such devices, an outer lighter area is produced around the fingers, apparently denoting the flesh of the fingers, and a darker inner area is produced, simulating the bone structure of the fingers.

These optical devices have been incorporated in eyeglasses for viewing a simulated X-ray image of an object, as well as in cameras to overlay the lens used in order to obtain a photograph of the simulated X-ray image.

Such devices have been used as toys, but primarily used to create amusing illusions, particularly as a result of a comparison between views of an actual object and the simulated X-ray image of this same object. While such comparison is easy to achieve in the case of eyeglasses by merely putting on and taking off the glasses, it has not heretofore been easily possible to do so in the case of cameras at the time photographs are desired to be taken.

SUMMARY OF THE INVENTION

Accordingly, it is an object of the invention to provide a camera in which a simulated X-ray image of an object may be viewed by the person using the camera to obtain a corresponding simulated X-ray image photograph of this viewed object.

Another object of the invention is to provide a camera which permits quick and easy sequential comparisons between a real image view and a simulated X-ray image view of an object to be photographed, and in accord with the type of image being photographed.

A further object of the invention is to provide a camera which can be used to obtain normal real image photographs, but which can be quickly and easily converted into a camera for viewing and obtaining simulated X-ray image photographs.

A still further object of the invention is to provide a camera which will provide an indication to a person looking through its eyepiece that the camera is in proper condition either to take a photograph of a real image of a viewed object or to take a photograph of a simulated X-ray image of a viewed object.

In general, in accord with the invention, a camera having an eyepiece and photographic lens arranged to have the same general field of view also carries two optical devices, each having means for providing a simulated X-ray image of an object viewed through the device. Means are also provided for enabling each of the two optical devices to be simultaneously brought into or out of optical registry with a respective one of the camera's eyepiece and lens.

In accord with certain features of the invention, the means for providing simulated X-ray images in each optical device comprises a pane of thermoplastic material having a plurality of parallel grooves in at least one surface. These thermoplastic panes are held by a bridging member which is slidably mounted on the camera to be movable between first and second movement limited positions. In a first position, one pane overlies the eyepiece in optical registry therewith while the other pane overlies the lens in optical registry therewith. In this first position a person using the camera may view and photograph simulated X-ray images of an object. In a second position, both panes no longer overlie or obstruct the eyepiece or lens and are not in registry therewith. In this second position the camera functions as a conventional camera, and a person using the camera may view and photograph real images of an object.

BRIEF DESCRIPTION OF THE DRAWINGS

The above and additional objects and advantages of the invention may be better understood by the following description taken in conjunction with the accompanying drawings in which:

FIG. 2 is a front plan view of the camera of FIG. 1 in condition for viewing and photographing a real image of an object;

FIG. 3 is a fragmentary cross-section of the front of the camera taken along plane 3—3 in FIG. 2 showing the position of the eyepiece of the camera relative to one of the X-ray image simulating optical devices when the camera is in the condition of FIG. 2;

FIG. 4 is an enlarged cross-section of a thermoplastic pane preferably used to provide the simulated X-ray images.

DETAILED DESCRIPTION OF THE INVENTION

Figure 1:
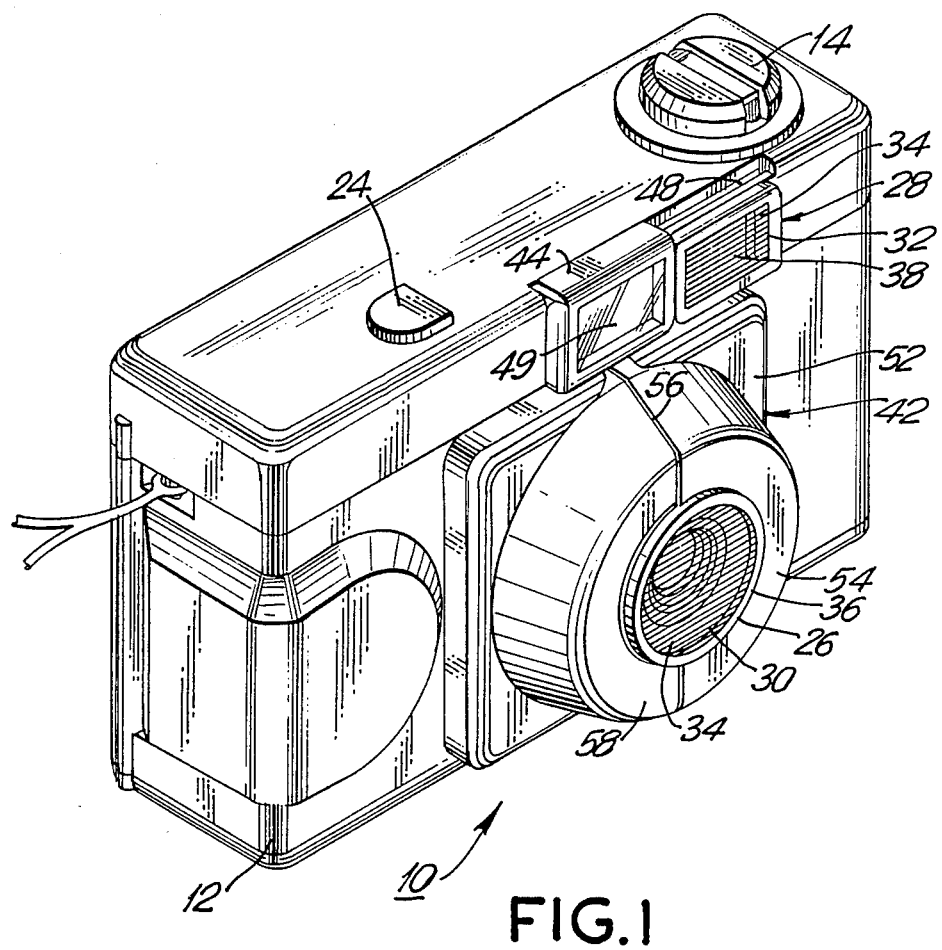
FIG. 1 is a perspective view of a camera of a first embodiment of the invention in condition for viewing and photographing a simulated X-ray image of an object.

Referring now to FIGS. 1-3, there is shown a camera 10 having a housing 12 within which a photographic film (not shown) is contained and wound on a reel 14. A transparent eyepiece 16, best seen in FIG. 3, covers an opening 18 near the top of the front surface of the housing 12. Eyepiece 16 cooperates with a corresponding opening and transparent eyepiece (not shown) in the rear of the housing to enable an object to be photographed to be viewed from the rear of the camera. As best shown in FIG. 2, a photographic lens 20 is located at the center of a central forwardly-projecting cylindrically-shaped lens-holding portion 22 of the housing 12. Eyepiece 16 and lens 20 are oriented to have the same general field of view. A depressible button 24 is located at the top of the housing 12 for actuating the shutter (not shown) of the camera to obtain a photograph.

In accord with the invention, two optical devices 26 and 28, each capable of providing a simulated X-ray image of an object viewed through the device, are carried by the camera. These optical devices preferably comprise panes 30 and 32, respectively of thermoplastic material, each pane containing a plurality of parallel grooves 34 which create the simulated X-ray images. The construction of these grooves is generally described hereinafter in connection with FIG. 4, and is more fully and completely described and claimed in my aforementioned U.S. Pat. No. 3,711,183. Pane 30 is supported within a circular frame 36, while pane 32 is supported within a rectangular frame 38.

In order to permit a view and photograph of such simulated X-ray images of an object to be compared with a view and photograph of real images of the same object, means are provided for moving the optical devices 26 and 28 into and out of simultaneous respective optical registry with eyepiece 16 and lens 20. In one of the embodiments of the invention shown in FIGS. 1 and 2, an additional rectangular eyepiece 40 is provided which can be optically registered with eyepiece 16 (FIG. 3). Eyepiece 40 is rigidly connected to and supports optical device 28 at the top of the camera, all generally located in front of the internal camera eyepiece 16. Eyepiece 40 and optical device 28 are both an integral part of and are supported by a bridging member 42. The latter has a substantially planar or base portion 52 on the top of which eyepiece 40 and optical device 28 are supported and a substantially semi-circular central portion 54 of the configuration mating that of a ridge or flange 58 in the lens-holding portion 22. The resulting assembly is slidably mounted on the camera by means of top and bottom flanges 44, 46 riding within channels 48, 50 (see FIG. 3) in the top and bottom surfaces of housing 12. Top flange 44 is connected to the frame of the additional eyepiece 40, while the bottom flange 46 is connected to the base 52 of the bridging member 42.

The central portion 54 of this bridging member 42 projects forwardly and is of the shape to conform to and overlay the forwardly projecting cylindrical lens-holding portion 22 of the camera when the bridging member 42 is moved to a first position shown in FIG. 1. In this position the semi-circular portion 54 of bridging member 42 nests against the side 56 of the similar raised semi-circular ridge 58 in the lens-holding portion 22 of the camera and further movement to the left is limited thereby. The circular optical device 26 which is attached to the semicircular portion 54 of bridging member 42 overlays and is in optical registry with the lens 20. Also, in this position the rectangular optical device 28 overlies and is in optical registry with the internal eyepiece 16 of the camera.

Referring now to FIG. 2, the camera 10 is shown with bridging member 42 slidably moved rightwards to a second position in which further movement to the right is limited by either of flanges 44 or 46 striking against the end of its respective channel 48 or 50. In this second limited position, the circular optical device 26 is moved completely away from, and out of optical registry with, the lens 20 so that lens 20 is unobstructed, while the rectangular optical device 28 is likewise moved completely away from and out of optical registry with the eyepiece 16 of the camera so that eyepiece 16 is unobstructed. However, in this position, as also shown in FIG. 3, the additional transparent eyepiece 40 overlies and is in optical registry with the internal eyepiece 16. It will be appreciated that although this additional eyepiece 40 serve no functional purpose photographically, it does serve not only to hold flange 44 and support optical device 28, but also to indicate to a person looking through the eyepiece 16 that the bridging member has indeed been moved completely to its second limiting position. If the bridging member has only been partly moved toward this second position, the eyepiece 16 will be partly obstructed by one end of the frame of this additional eyepiece 40.

Referring now to FIG. 4, an enlarged cross-section of a portion of panes 30 and 32 is shown. The plurality of parallel grooves 34 are located on at least one surface, each groove including a vertical wall 34a and an inclined wall 34b which extends at an acute angle of less than five, and preferably about three and one-half, degrees with the plane defined by the surface. Each groove may be 0.0001 inches deep (d) and 0.002 inches wide (w). The thermoplastic material of panes 30, 32 may conveniently be polystyrene. The parallel grooves should preferably be oriented to run horizontally in the panes when supported on the camera in the manner shown so that an optimum simulated X-ray image of a vertically arranged object will be obtained when the camera is likewise oriented horizontally. With parallel grooves on only one surface the simulated image is limited to approximately 180 degrees. If it is desired to obtain a stereoscopic 360 degree simulated X-ray image, parallel grooves may be provided in each of the opposite surfaces of panes 30, 32 which extend transversely to one another, in other words, with one set of parallel grooves on one surface extending horizontally and the other set of parallel grooves in the opposite surface extending vertically.

In using the camera 10, a person may first view and, if desired, take a photograph of a real image of an object with the bridging member 42 in its second limited position as shown in FIG. 2. Then, by merely sliding bridging member 42 and its attached optical devices 26, 28 into its first limited position as shown in FIG. 1, compare this real image with a view of the simulated X-ray image of this same object, and, if desired, take a photograph of a corresponding simulated X-ray image of the object. The image which a person receives while looking through the eyepiece 16 of the camera will thus always correspond to the image which the lens of the camera receives, and a comparison between the real and simulated images may quickly and easily be achieved. Moreover, the person using the camera can easily determine by looking through the eyepiece 16 that the bridging member is properly located in either of its two limited positions. It should be appreciated that other types of lenses could be used to provide the simulated X-ray image and photographs.

Figure 5:
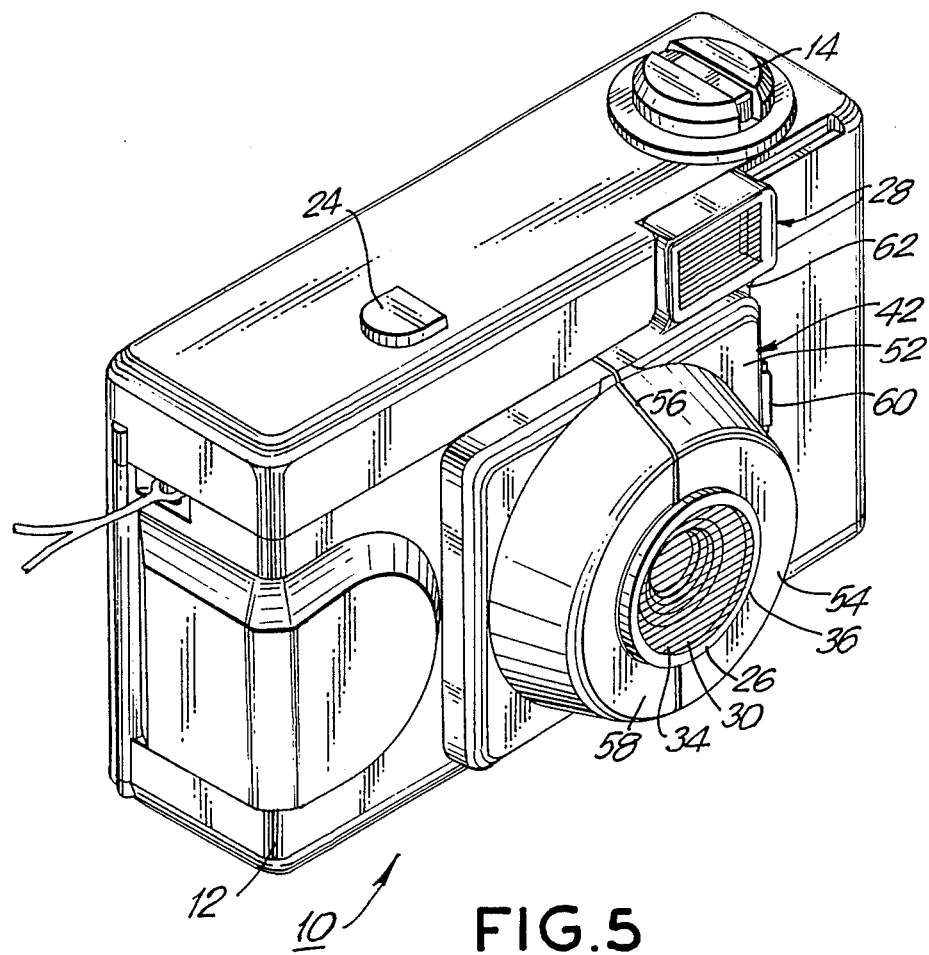
FIG. 5 is a view similar to that of FIG. 1 but of another embodiment of the invention.

With reference to FIG. 5 it will be seen that the bridging member 42 supporting both the optical device 26 and optical device 28 can be hinged to the housing 12 of the camera by means of one or two hinges 60 so that bridging member 42 can be pivoted to bring optical devices 26 and 28 to register with or out of registry from lens 20 and eyepiece 16, respectively. In this embodiment, additional eyepiece 40 as well as channels 48, 50 are omitted. A web 62 is provided on the bridging member 42 to connect portion 52 with the frame of the optical device 28. All the remaining elements of the embodiment of FIG. 5 are similar to those of FIGS. 1-4.

While I have described a preferred embodiment of the invention, many modifications may be made, and it is intended by the appended claims to cover all such modifications and equivalents as fall within the scope of these claims,

I claim:

1. A camera comprising an eyepiece and a lens each having the same general field of view, two optical devices each having means for simulating an X-ray image of an object viewed through the device, and means carried by said camera for enabling each one of said optical devices to be simultaneously brought completely out of optical registry with a respective one of said eyepiece and lens to enable a user to view a real image of an object and, if desired, to take a photograph of said real image or into optical registry with a respective one of said eyepiece and lens to enable a user to view a simulated X-ray image of the same object and if desired, to take a photograph of the simulated X-ray image of said object.

2. The camera of claim 1, wherein the means in each optical device for simulating an X-ray image comprises a pane of thermoplastic material having a plurality of parallel grooves in at least one surface thereof.

3. The camera of claim 1, wherein the means in each optical device for simulating an X-ray image comprises a pane of thermoplastic material having a plurality of parallel grooves in opposite surfaces thereof, the parallel grooves in one surface being transverse to the parallel grooves in the opposite surface.

4. The camera of claim 1, wherein the means for enabling each one of said optical devices to be simultaneously brought into and out of optical registry with a respective one of said eyepiece and lens comprises a bridging member attached to both said optical devices, said bridging member and attached optical devices being slidably mounted on said camera.

5. The camera of claim 4, wherein the bridging member and optical devices are mounted on said camera to be slidable between a first movement limited position wherein each of said optical devices overlays and is in optical registry with a respective one of said eyepiece and lens and a second movement limited position wherein said optical devices are completely away from and out of optical registry with said eyepiece and lens.

6. The camera of claim 5, wherein an additional transparent eyepiece is also attached to said bridging member and slidable together therewith, said additional eyepiece being located to overlay and be in optical registry with said camera eyepiece when the slidable member and optical devices are in said second movement limited position.

7. The camera of claim 5, wherein the means in each optical device for simulating an X-ray image comprises a pane of thermoplastic material having a plurality of grooves in at least one surface thereof.

8. The camera of claim 7, wherein each groove comprises a vertical wall and a connecting inclined wall which make an acute angle of less than five degrees with the surface of said pane of thermoplastic material.

9. The camera of claim 1, wherein the means for enabling each one of said optical devices to be simultaneously brought into and out of optical registry with a respective one of said eyepiece and lens comprises a bridging member attached to both said optical devices, said bridging member and attached optical devices being pivotally mounted on said camera.

10. The camera of claim 9, wherein the bridging member and optical devices are mounted on said camera to be pivotable between a first position wherein each of said optical devices overlays and is in optical registry with a respective one of said eyepiece and lens and a second position wherein said optical devices are completely away from and out of optical registry with said eyepiece and lens.

11. The camera of claim 9, wherein the means in each optical device for simulating an X-ray image comprises a pane of thermoplastic material having a plurality of parallel grooves in at least one surface thereof.

12. The camera of claim 9, wherein the means in each optical device for simulating an X-ray image comprises a pane of thermoplastic material having a plurality of parallel grooves in opposite surfaces thereof, the parallel grooves in one surface being transverse to the parallel grooves in the opposite surface.

13. The camera of claim 11, wherein each groove comprises a vertical wall and a connecting inclined wall which make an acute angle of less than five degrees with the surface of said pane of thermoplastic material.

14. For use with a camera having an eyepiece for viewing an object and a lens for photographing the object, a pair of optical devices each having means for simulating an X-ray image off an object viewed through the device comprising a pane of thermoplastic material having a plurality of parallel grooves in at lest one surface thereof, a bridging member attached to both said optical devices, said bridging member and said attached optical devices being slidably mounted on said camera and moveable between a first movement limited position wherein each of said optical devices overlays and is in optical registry with a respective one of said eyepiece and lens and a second movement limited position wherein said optical devices are completely away from and out of registry with said eyepiece and lens.

15. The combination of claim 14, wherein an additional transparent eyepiece is also attached to said bridging member and is slidable together therewith, said additional eyepiece being located to overlay and be in optical registry with the camera eyepiece when the bridging member and optical devices are in their second movement limited position.

16. A camera comprising an eyepiece and a lens each having the same general field of view, two optical devices each having means for simulating an X-ray image of an object viewed through the device, and means carried by said camera for enabling each one of said optical devices to be simultaneously brought into optical registry or completely our of optical registry with a respective one of said eyepiece and lens, wherein the means for enabling each one of said optical devices to be simultaneously brought into and out of optical registry with a respective one of said eyepiece and lens comprises a bridging member attached to both said optical devices, said bridging member and attached optical devices being slidably mounted on said camera.

17. The camera of claim 16, wherein the bridging member and optical devices are mounted on said camera to be slidable between a first movement limited position wherein each of said optical devices overlays and is in optical registry with a respective one of said eyepiece and lens and a second movement limited position wherein said optical devices are completely away from and out of optical registry with said eyepiece and lens.

18. The camera of claim 17, wherein an additional transparent eyepiece is also attached to said bridging member and slidable together therewith, said additional eyepiece being located to overlay and be in optical registry with said camera eyepiece when the slidable member and optical devices are in said second movement limited position.

19. The camera of claim 17, wherein the means in each optical device for simulating an X-ray image comprises a pane of thermoplastic material having a plurality of grooves in at least one surface thereof.

20. The camera of claim 17, wherein each groove comprises a vertical wall and a connecting inclined wall which make an acute angle of less than five degrees with the surface of said pane of thermoplastic material.

* * * * *